United States Patent
Anand

(10) Patent No.: US 7,460,558 B2
(45) Date of Patent: Dec. 2, 2008

(54) SYSTEM AND METHOD FOR CONNECTION CAPACITY REASSIGNMENT IN A MULTI-TIER DATA PROCESSING SYSTEM NETWORK

(75) Inventor: Vaijayanthimala K. Anand, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 11/014,110

(22) Filed: Dec. 16, 2004

(65) Prior Publication Data

US 2006/0133418 A1    Jun. 22, 2006

(51) Int. Cl.
H04J 3/16    (2006.01)
H04J 3/22    (2006.01)

(52) U.S. Cl. .................................... 370/468
(58) Field of Classification Search ................ 370/428, 370/412–418, 468, 465, 464, 395.4, 395.41, 370/395.42, 395.43; 709/223, 276
See application file for complete search history.

(56) References Cited

U.S. PATENT DOCUMENTS

| | | |
|---|---|---|
| 6,633,916 B2 | 10/2003 | Kauffman |
| 6,717,949 B1 | 4/2004 | Boden et al. |
| 6,725,332 B2 | 4/2004 | Leenstra et al. |
| 6,741,559 B1 | 5/2004 | Smeulders et al. |
| 6,754,716 B1 | 6/2004 | Sharma et al. |
| 7,024,460 B2 | 4/2006 | Koopmas et al. |
| 7,093,288 B1 | 8/2006 | Hydrie et al. |
| 7,164,656 B2 | 1/2007 | Foster et al. |
| 7,240,136 B2 | 7/2007 | Anand |
| 2002/0194342 A1 | 12/2002 | Lu et al. |
| 2003/0032390 A1* | 2/2003 | Geile et al. ................ 455/3.05 |
| 2003/0172145 A1* | 9/2003 | Nguyen ...................... 709/223 |
| 2003/0225815 A1 | 12/2003 | Brenner et al. |
| 2004/0177150 A1 | 9/2004 | Kogan |
| 2005/0021491 A1 | 1/2005 | Horgan |
| 2005/0053046 A1 | 3/2005 | Wang |
| 2005/0111477 A1* | 5/2005 | Ghanma et al. ............ 370/445 |
| 2005/0270993 A1 | 12/2005 | Rajamani et al. |
| 2006/0129679 A1* | 6/2006 | Hlasny ....................... 709/227 |
| 2006/0168217 A1 | 7/2006 | Anand |
| 2007/0104215 A1* | 5/2007 | Wang et al. ................ 370/458 |

* cited by examiner

*Primary Examiner*—Ajit G Patel
(74) *Attorney, Agent, or Firm*—Duke W. Yee; Marilyn S. Dawkins; James O. Skarsten

(57) ABSTRACT

A method, computer program product, and a data processing system for data prioritization in a multi-tier network system is provided. A server having a plurality of processors receives data from a client. A priority of the client is then identified. Responsive to identifying the priority, the data is queued in a queue of a first plurality of queues associated with a first processor of the plurality of processors. The queue is one of a plurality of queues associated with the first processor and is associated with the priority. Additionally, mechanisms for reassigning connection capacity from one priority class to another priority class at the network layer in a multi-tier network system is provided. As the capacity of connections of one priority class approaches saturation, spare capacity may be reassigned from another class to the priority class approaching saturation between the first-tier systems. Additionally, mechanisms for replicating or mirroring the connection capacity reassignment between second-tier systems is provided.

20 Claims, 9 Drawing Sheets

FIG. 9A
| SOURCE ADDRESS | PRIORITY | CAPACITY |
|---|---|---|
| 9.3.194.7 | HIGH | 100 |
| 9.3.194.9 | LOW | 100 |
950, 951, 952
FIG. 9B
| SOURCE ADDRESS | PRIORITY | CAPACITY |
|---|---|---|
| 9.3.194.7 | HIGH | 150 |
| 9.3.194.9 | LOW | 50 |
950, 951, 952
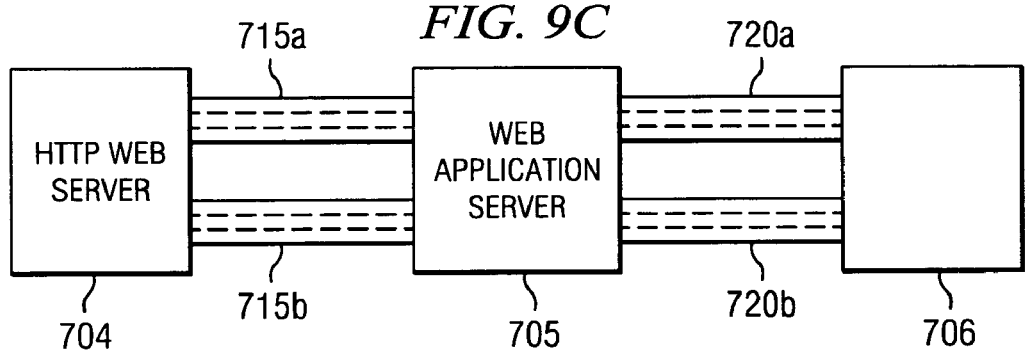
FIG. 9C
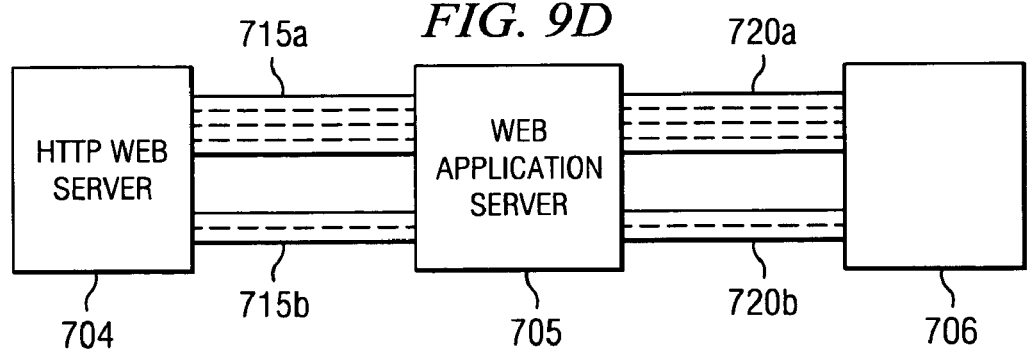
FIG. 9D

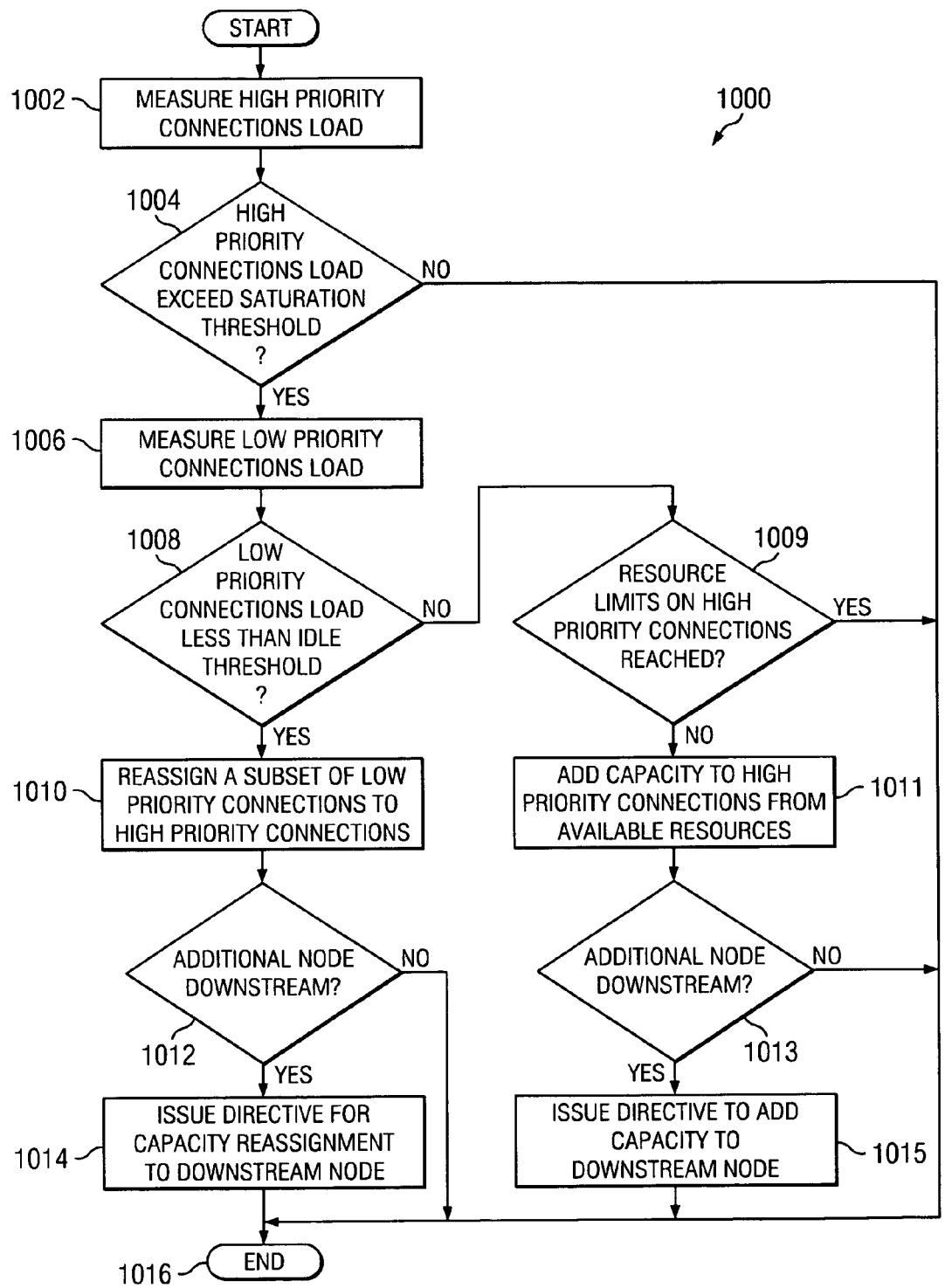

SYSTEM AND METHOD FOR CONNECTION CAPACITY REASSIGNMENT IN A MULTI-TIER DATA PROCESSING SYSTEM NETWORK

RELATED APPLICATIONS

This application is related to commonly assigned and co-pending U.S. patent application Ser. No. 11/014,070 now U.S. Pat. No. 7,240,136, entitled "SYSTEM AND METHOD FOR REQUEST PRIORITY TRANSFER ACROSS NODES IN A MULTI-TIER DATA PROCESSING SYSTEM NETWORK," and U.S. patent application Ser. No. 11/014,069, entitled "METHOD, COMPUTER PROGRAM PRODUCT, AND DATA PROCESSING SYSTEM FOR DATA QUEUING PRIORITIZATION IN A MULTI-TIERED NETWORK," which are hereby incorporated by reference.

BACKGROUND OF THE INVENTION

1. Technical Field

The present invention relates generally to an improved data processing system and, in particular, to a mechanism for data queue prioritization in a multi-tier network system. Still more particularly, the present invention provides a mechanism for queuing client data prioritized in a networked data processing system on a per-processor basis. Additionally, the present invention provides a mechanism for dynamically adjusting the priority of persistent connections between a mid-tier and backend data server at the network layer in a multi-tier network.

2. Description of Related Art

Various networked data processing system traffic control schemes for queuing and filtering network traffic are used for providing service level agreement (SLA) traffic prioritization. For example, the Linux network stack has infrastructure for traffic control that has queuing disciplines (qdisc) and filters. A hierarchy of qdiscs can be constructed jointly with a class hierarchy to support Quality of Service (QoS) features. Traffic can be routed to different classes by employing filters that are matched against packet header fields.

For receive side, that is the server side in a multi-tier network, prioritization is provided on a connection basis. For example, when an incoming connection is established, the connection may be prioritized based on one or more priority filters to queue the connection in one of a plurality of queues allocated to different priority classes. However, such queuing mechanisms rely on connection prioritizations. For example, in a network using the transport control protocol/Internet protocol (TCP/IP), a connection is established after completion of a three-phase process typically referred to as a three-way handshake. In such systems, prioritization is limited to granting or denying a connection based on a client priority level and, for example, network metrics such as traffic loads.

In implementations where prioritization is enforced only at the connection level, priority is enforced depending on the arrival of the incoming connections when multiple priority clients are serviced concurrently. For example, if the arrival of the connections are a mix of high and low priority connections then high priority connections are serviced prior to servicing the low priority connections. However, after the connections are established, all the connections are treated without any discrimination.

Additionally, SLA traffic prioritization may sometimes result in inefficient utilization of the overall network system transmission capacity. For example, the network system transmission capacity may be partitioned into capacities that are respectively allocated to different traffic priority classes. In the event that one traffic priority class experiences a heavy load, the network system capacity allocated to that traffic priority class may become saturated, or consumed. In the event that a second traffic priority class experiences a traffic load below the capacity allocated to the second traffic priority class, an idle portion of the second traffic priority class capacity will be unused, while at the same time traffic of the first priority class may be blocked from transmission due to saturation of the first traffic priority class. In such a situation, the overall network transmission capacity is underutilized.

It would be advantageous to provide a mechanism for network-level prioritization for providing SLA prioritization queuing of inbound traffic at a server providing connectivity to clients of different priorities. It would be further advantageous to provide a mechanism for providing network-level prioritization in a multi-processor system of a multi-tier network for priority queuing of incoming traffic on a per-processor basis. It would further be advantageous to provide a mechanism to more efficiently utilize network transmission capacity in a network featuring SLA prioritization of traffic data.

SUMMARY OF THE INVENTION

The present invention provides a method, computer program product, and a data processing system for data prioritization in a multi-tier network system. A server having a plurality of processors receives data from a client. A priority of the client is then identified. Responsive to identifying the priority, the data is queued in a queue of a first plurality of queues associated with a first processor of the plurality of processors. The queue is one of a plurality of queues associated with the first processor and is associated with the priority. Additionally, mechanisms for reassigning connection capacity from one priority class to another priority class at the network layer in a multi-tier network system based on changes in SLAs used for the first-tier setups to facilitate optimized utilization of the transmission capacity of a multi-tier network is provided. As the capacity of connections of one priority class approaches saturation, spare capacity may be reassigned from another class to the priority class approaching saturation between the first-tier systems. Additionally, mechanisms for replicating or mirroring the connection capacity reassignment between second-tier systems is provided.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9A is a diagrammatic illustration of a priority filter that facilitates dynamic reassignment of connection capacities between connection priority classes in accordance with a preferred embodiment of the present invention;

FIG. 9B is a diagrammatic illustration of the priority filter shown in FIG. 9A after reassignment of connection capacity between connection priority classes in accordance with a preferred embodiment of the present invention;

FIG. 9C is a diagrammatic illustration of a web server, web application server, and a backend database server and connections therebetween in which connection capacity may be reassigned between priority classes in accordance with a preferred embodiment of the present invention;

FIG. 9D is a diagrammatic illustration of the web server, web application server, and the backend database server and connections therebetween depicted in FIG. 9C after connection capacity reassignment between priority classes has been performed in accordance with a preferred embodiment of the present invention;

FIG. 10 is a flowchart of a connection priority reassignment routine for reassigning connection capacity between different priority classes in accordance with a preferred embodiment of the present invention.

DETAILED DESCRIPTION OF THE PREFERRED EMBODIMENT

Figure 1:
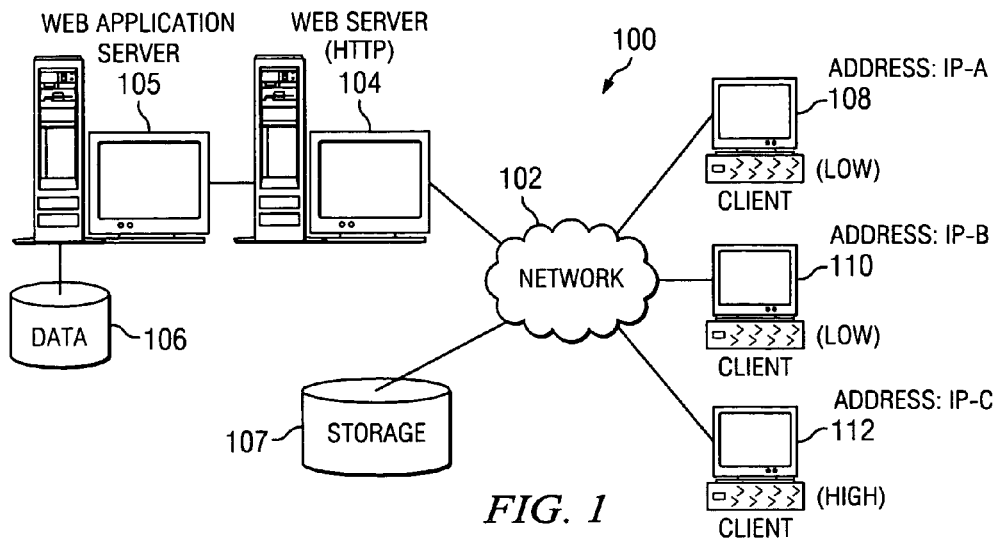
FIG. 1 depicts a pictorial representation of a multi-tier network of data processing systems in which a preferred embodiment of the present invention may be implemented.

With reference now to the figures, FIG. 1 depicts a pictorial representation of a multi-tier network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables. In the depicted example, web server 104 is connected to network 102 along with storage unit 107. In addition, clients 108, 110, and 112 are connected to network 102. These clients 108, 110, and 112 may be, for example, personal computers or network computers. In the depicted example, web server 104 may be implemented as an HTTP server that sends web pages to clients 108-112 responsive to receiving an HTTP request from, for example, browsers running on clients 108-112. Additionally, web server 104 may provide data other than HTTP data, such as applications, to clients 108-112. Clients 108, 110, and 112 are clients to web server 104. Web server 104 interfaces and communicates with web application server 105. Web application server 105 handles application operations between browser-issued requests issued by clients 108-112 and back end applications or databases maintained by data store 106, such as a backend database system, that interfaces with web application server 105.

Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
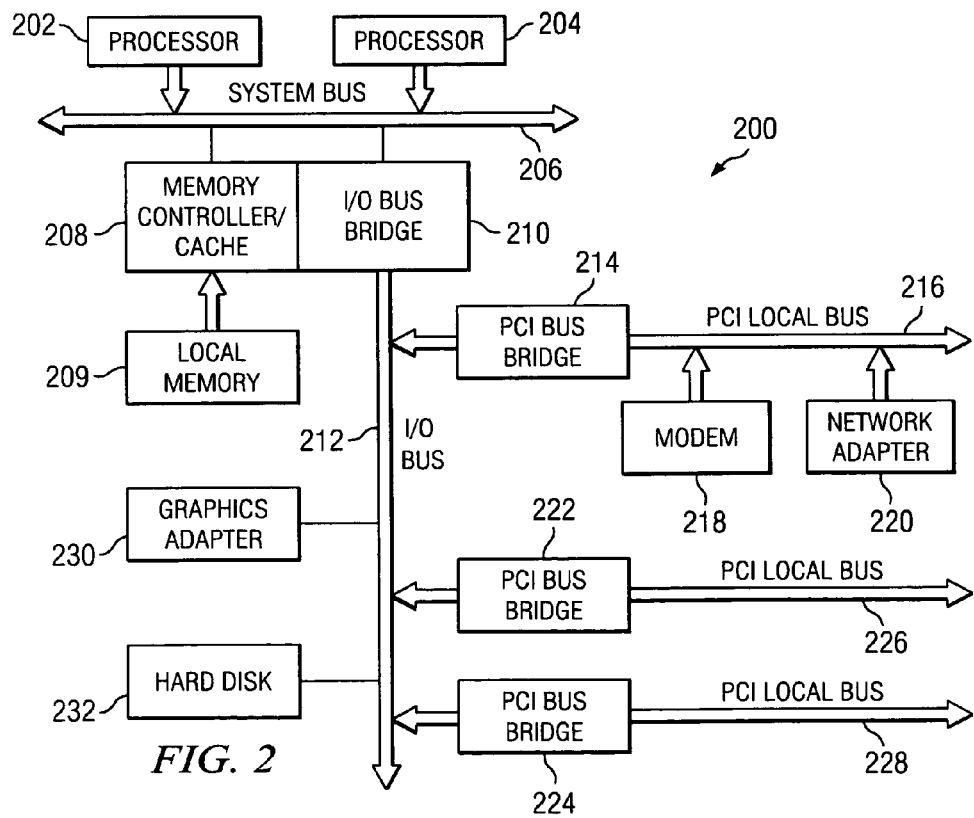
FIG. 2 is a block diagram of a data processing system that may be implemented as a server depicted in accordance with a preferred embodiment of the present invention.

Referring to FIG. 2, a block diagram of a data processing system that may be implemented as a server, such as web server 104 or web application server 105 in FIG. 1, is depicted in accordance with a preferred embodiment of the present invention. Data processing system 200 may be a symmetric multiprocessor (SMP) system including a plurality of processors 202 and 204 connected to system bus 206 although other multi-processor configurations may be suitably substituted therefor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
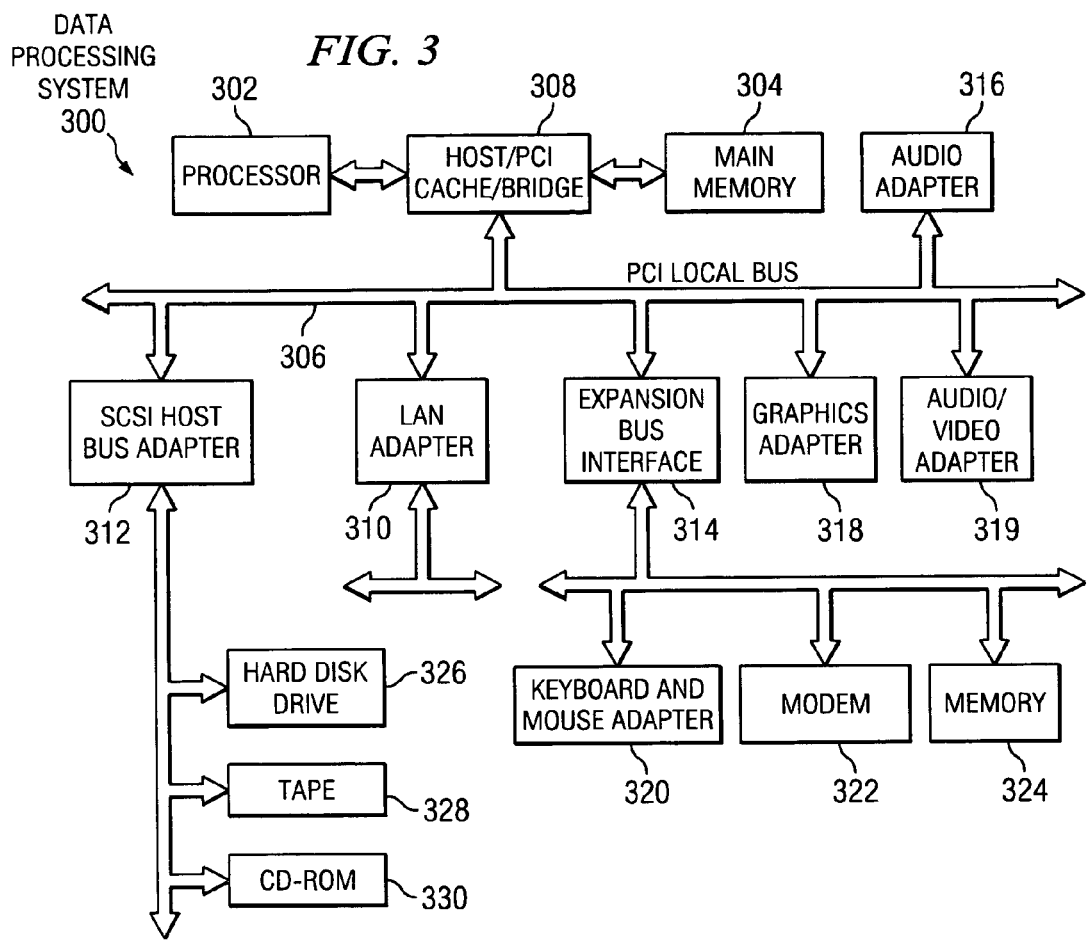
FIG. 3 is a block diagram illustrating a client data processing system that may have data prioritized in accordance with a preferred embodiment of the present invention.

With reference now to FIG. 3, a block diagram illustrating a data processing system is depicted in which the present invention may be implemented. Data processing system 300 is an example of a client computer, such as client 108 shown in FIG. 1. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

A client, such as client 108, initiates a communication connection with web server 104. In the illustrative examples provided herein, communication connections between a client and server are described with reference to the TCP/IP protocol suite, although other communication protocols may be suitably substituted therefor. Implementations of the present invention are not limited to any particular protocol and those described are provided only to facilitate an understanding of the invention.

Figure 4:
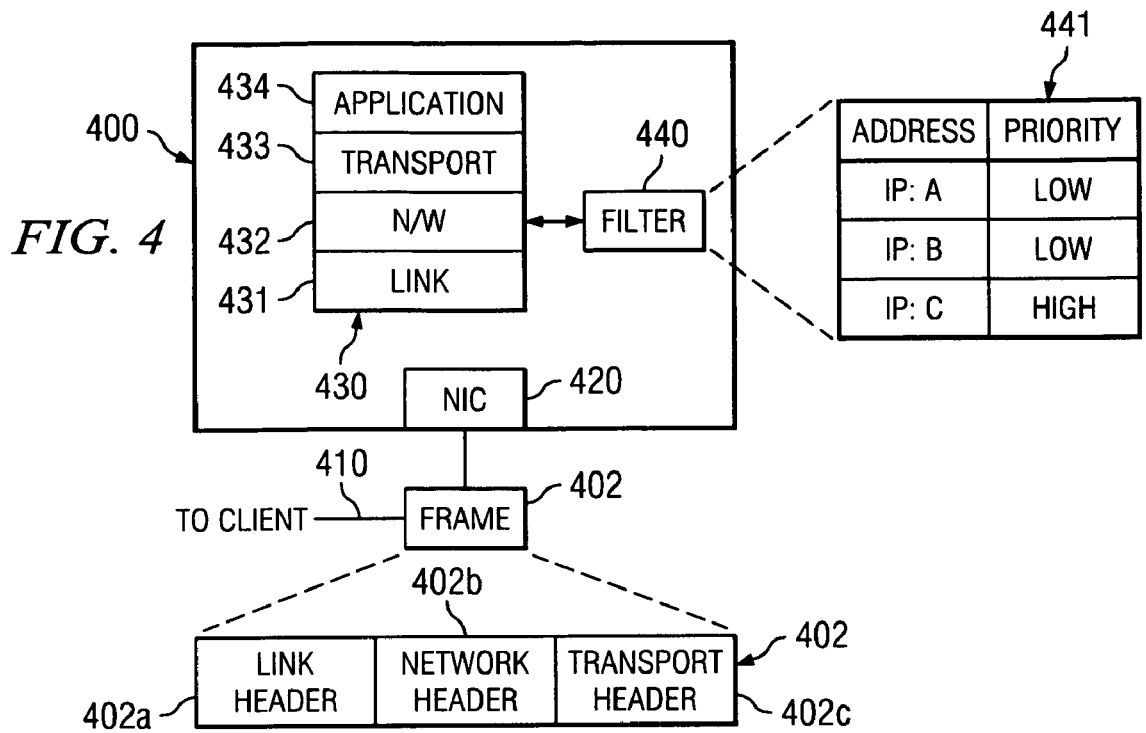
FIG. 4 is a diagrammatic illustration of a server configuration for enforcing data prioritization on a network level in accordance with a preferred embodiment of the present invention.

FIG. 4 is a diagrammatic illustration of a server configuration for enforcing data prioritization on a network level in accordance with a preferred embodiment of the present invention. Server 400 is an example of a data processing system, such as data processing system 200 shown in FIG. 2, that provides connectivity to clients of different priority classes and is implemented as a multi-processor data processing system. A client, such as client 108, will initiate a communication connection with server 400 by first engaging in a handshake with server 400. To establish a connection, a client addresses frame 402 to server 400 and applies frame 402 to network media 410, e.g., a 10baseT, 100baseT, or other suitable network media. Frame 402 comprises various encapsulated headers. In the present example, the client and server connect over the Internet and thus frame 402 comprises a link header 402a, e.g., an Ethernet header, network layer header 402b, e.g., an IP header, and transport layer header 402c, e.g., a TCP header. For example, frame 402 may encapsulate a synchronization (SYN) segment comprising transport layer header 402c having an asserted SYN flag for initiating a handshake with server 400. Server 400 receives frame 402 via network interface card 420, e.g., an Ethernet card, that conveys the frame to link layer 431, e.g., an Ethernet driver, of network stack 430. Link layer 431 decapsulates, or demultiplexes, the IP datagram from the frame and passes the IP datagram to network layer 432 of network stack 430. Network layer 432 demultiplexes the TCP segment from the IP datagram and passes the TCP segment to transport layer 433 of network stack 430.

In accordance with a preferred embodiment of the present invention, filter 440 additionally receives the demultiplexed IP datagram for priority filtering of the imminent connection. Filter 440 preferably comprises logic for determining a priority-level of the client that originated the data. For example, filter 440 may determine a priority level of the client based on a source address, e.g., an IP source address, and port number read from the network layer header 402b in frame 402. The determination of the priority level is made by comparing one or more data values from frame 402 with pre-established criteria that is coded in, or accessed by, filter 440. In the illustrative example, filter 440 includes (or interfaces with) table 441 that associates or maps client addresses, e.g., IP network addresses, with priority levels that are associated with clients, for example according to service level agreements (SLAs) to which clients are subscribed. Table 441 is illustrative only and various other data structures that associate a client identifier, e.g., a network address, and a priority level may be suitably substituted therefor. As shown in FIG. 1, clients 108-112 having respective IP addresses of IP-A, IP-B and IP-C, and table 441 associates priority levels of low, low, and high, respectively, to clients 108-112. After (or concurrently with) identification of the client priority, the web server and client complete the connection, for example by completion of a three-way handshake. In accordance with a preferred embodiment of the present invention, traffic received by the web server after establishment of the connection with a client is priority filtered at a network layer on a per-processor basis in accordance with a client priority identified at connection of the client with the server.

Figure 5:
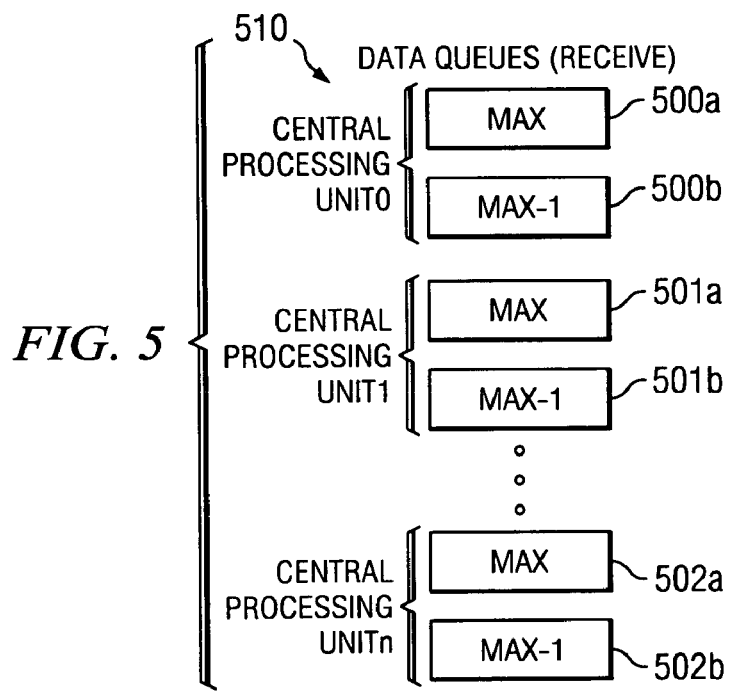
FIG. 5 is a data queue diagram configuration for service level agreement prioritization on a multi-processor server in a multi-tier network in accordance with a preferred embodiment of the present invention.

FIG. 5 is a data queue diagram configuration for service level agreement prioritization on a multi-processor server in a multi-tier network in accordance with a preferred embodiment of the present invention. Data queue configuration 510 may be implemented as computer-readable instructions stored in a memory, such as local memory 209, and fetched therefrom by a processing unit, such as processor 202 or 204 shown in FIG. 2. In the illustrative example, assume web server 104 is a symmetric multi-processor system comprising n central processing units (designated CPU0-CPUn). In the illustrative example, each of processors CPU0-CPUn respectively have two queues allocated thereto for bi-level prioritization. Particularly, processor CPU0 has two queues 500a and 500b for bi-level prioritization queuing of data received by web server 104 from clients having one of two priority levels assigned thereto. In the present example, queue 500a is allocated for data received from clients of a first (max) priority, and queue 500b is allocated for frames received from clients of a low (max−1) priority. In the illustrative examples, queues of two priorities per processor are shown. However, the bi-level prioritization provided in the examples is illustrative only and is chosen to facilitate an understanding of the invention, and any number of processor queues and corresponding client priority levels may be substituted for the configuration shown.

In a similar manner, other processors within the web server have similarly configured queues. In the illustrative example, processor CPU1 has queue 501a allocated for data received from high priority clients, and queue 501b is allocated for data received from clients of a low priority. Likewise, processor CPUn has queues 502a-502b allocated for respective data received from high and low priority clients.

Figure 6:
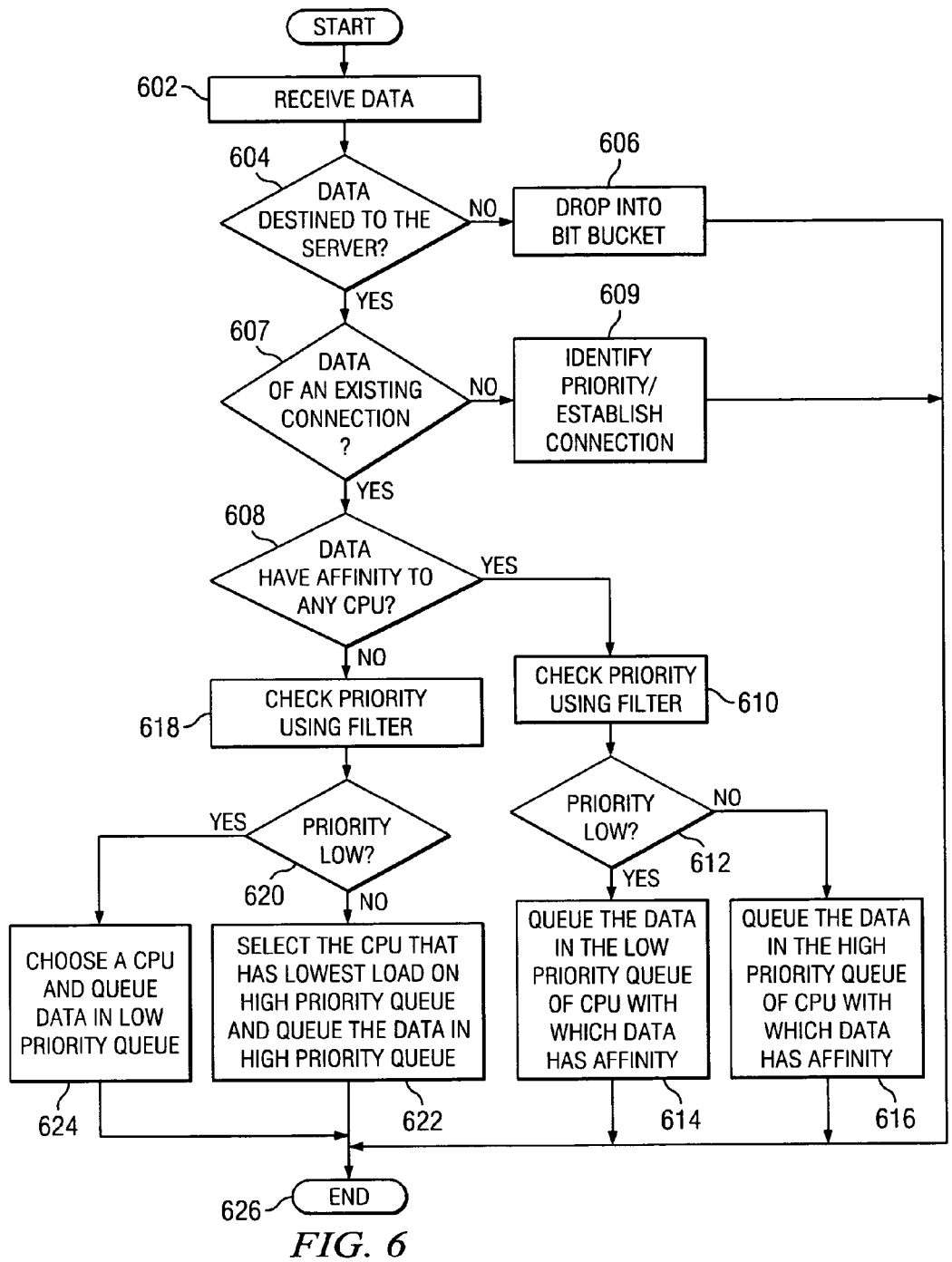
FIG. 6 is a flowchart of a data queuing routine run on a server in accordance with a preferred embodiment of the present invention.

FIG. 6 is a flowchart of a data queuing routine run on a server, such as server 400 shown in FIG. 4, providing prioritized services to clients in accordance with a preferred embodiment of the present invention. The priority queuing routine shown in FIG. 6 is executed at a network layer, for example within network stack 430 shown in FIG. 4. The routine begins and awaits receipt of data. On receipt of the data (step 602), an evaluation is made to determine that the data was targeted to the receiving system (step 604), e.g., by evaluation of the destination address in network layer header 402b. In the event the data was not destined for the receiving system, the data is dropped into a bit bucket or otherwise discarded (step 606), and the data queuing routine cycle ends (step 626).

Returning again to step 604, in the event that the data is destined to the receiving system, an evaluation is then made to determine if the data comprises traffic of an existing connection (step 607). For example, a source address and port number of the data may be read and compared with existing connection sockets. If the data is not part of an existing connection, a priority level of the client that originated the data is identified, and a connection with the client is established (step 609). The data queuing routine cycle then ends according to step 626.

Returning again to step 607, if the data is traffic of an existing connection, an evaluation is then made to determine if the data has affinity with any of the system CPUs (step 608). As referred to herein, data is said to have affinity with a processor when the processor, or resources associated with the processor such as a cache system or the like, holds data, such as context data, necessary for processing of the data. If the data is identified as having affinity for any of the system processors, a priority of the data is then identified (step 610). For example, the source address of network layer header 402b may be read and compared to a predefined criteria that correlates source addresses and priority levels as defined or accessed by filter 440 shown in FIG. 4. An evaluation of the priority is then made (step 612). In the event the data priority is evaluated as low at step 612, the data is placed in the low priority queue of the processor with which the frame is identified as having affinity (step 614), and the prioritization routine cycle then ends according to step 626. Alternatively, if the data is evaluated as high priority data at step 612, the data is placed in the high priority queue of the processor with which the data is identified as having affinity (step 616). The prioritization routine cycle then ends according to step 626.

Returning again to step 608, if the data is not identified as having affinity with any system processors, the priority level of the frame is then checked (step 618), and an evaluation is then made to determine if the data was originated from a client having a low priority (step 620). If it is determined that the data originated from a client having a low priority, a CPU is then chosen and the data is placed in a low priority queue of the chosen CPU (step 624). For example, a CPU chosen for queuing of the data may be made by a round robin selection routine. Other scheduling mechanisms may be suitably substituted therefor. Once the data is placed in a low priority queue of a CPU, the prioritization routine cycle then ends according to step 626.

Returning again to step 620, in the event that the data is identified as originating from a high priority client (that is, the client priority is not identified as a low priority at step 620), the data is placed in a high priority queue of one of the system processors (step 622), for example by selecting the processor that has the lowest number of tasks in its respective high priority queue. The prioritization routine cycle then ends according to step 626.

Data is then retrieved from the processor queues based on the queue priority for transmission of the data across the network. For example, data queued on a per-processor basis at web server 104 shown in FIG. 1 that comprises a database transaction to be performed on data store 106 is transmitted from web server 104 to web application server 105 according to the data prioritization, that is with processing precedence provided to higher priority requests with respect to lower priority requests.

Thus, the transmission of data during processing of a transaction in a multi-processor data processing system deployed in a multi-tier network is made in accordance with client priority classes. By allowing multiple queuing mechanisms at the data queue level in the TCP/IP network stack and correlating the connection priority with the data priority, higher priority clients are ensured to get requests serviced before a lower priority client.

Figure 7A:
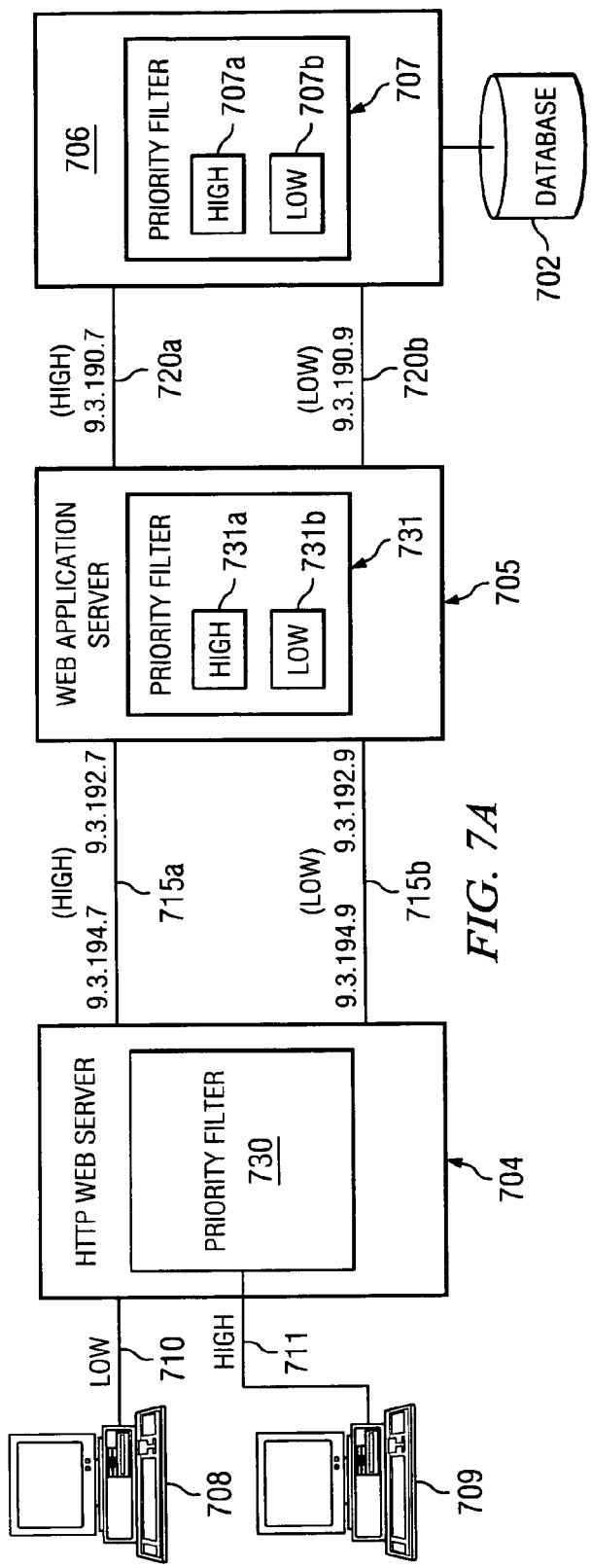
FIG. 7A is a diagrammatic illustration of a multi-tier network system in which request priority transfers are implemented according to a preferred embodiment of the present invention.

In accordance with another embodiment of the present invention, a mechanism for extending or transferring request priorities from node-to-node in a multi-tier network system is provided. FIG. 7A is a diagrammatic illustration of a multi-tier network system in which data priority transfers are implemented according to a preferred embodiment of the present invention. In the illustrative example, a web server 704 implemented as an HTTP server sends web pages or other data to clients 708 and 709 by way of respective client connections 710 and 711 responsive to receiving HTTP requests therefrom. Additionally, web server 704 may provide data other than HTTP data, such as applications, to clients 708 and 709. Web server 704 interfaces and communicates with web application server 705. Web application server 705 handles application operations between browser-issued requests issued by clients 708 and 709 and back-end applications or databases, such as back-end database server 706 that interfaces with web application server 705 and that executes database transactions on database 702.

In general, respective connections 710 and 711 between clients 708 and 709 and web server 704 are established as dynamic or short-lived connections. Connections 715a-715b and 720a-720b respectively interconnecting web server 704 with web application server 705 and web application server 705 with backend database server 706 are persistent connections. In accordance with a preferred embodiment of the present invention, a priority of a transaction request submitted by a client that is received at web server 704 is identified by web server 704 as described above. The priority is then propagated to a persistent connection with back-end database server 706. To this end, web server 704, during establishment of persistent connections 715a-715b with web application server 705, assigns priorities to connections 715a-715b. Likewise, application server 705, during establishment of persistent connections 720a and 720b with back-end database server 706, assigns priorities to connections 720a and 720b. In the illustrative example, each of connections 715a-715b and 720a-720b are representative of one or more similar connections. For example, connections 715a may be implemented as a pool of a plurality of connections each assigned (or collectively assigned) a common priority. In the present example, connections 715a and 720a are respectively representative of one or more connections of a first priority class, high (HI), and connections 715b and 720b are respectively representative of one or more connections of a second, lower priority class, low (LO).

Prioritized processing of client requests is provided by transferring, or extending, priority processing across all nodes involved in processing a client request. Each of the nodes involved in processing the transaction, e.g., web server 704, web application server 705, and backend database server 706, provides priority precedence in processing of data. For example, web server 704, on receipt of data from a client, identifies a priority of the client data by, for example, the mechanisms described above with respect to FIG. 4. Data is then queued and processed at web server 704 according to the data priority corresponding to the client priority level identified by web server 704. For example, assume web server 704 has received and queued both high priority data of a transaction request from a high priority client to be processed by backend database server 706 and low priority data of a transaction request from a low priority client to be processed by backend database server 706. The high priority data is transmitted to web application server 705 prior to transmission of the low priority data due to the processing precedence provided to the high priority client. Web application server 705, in turn, processes the data received from web server 704 according to the client data priority. In accordance with one embodiment of the present invention, web application server 705 priority processes data according to the connection on which the data is received at web application server 705. In the illustrative example, data received by web application sever 705 via HI priority connections 715a is placed in high priority queue 731a of (or interfaced with) priority filter 731, and data received by web application server via LO priority connections 715b is placed in low priority queue 731b of (or interfaced with) priority filter 731. Accordingly, high priority data processed and transmitted with precedence over low priority data by web server 704 is likewise provided processing precedence by web application server 705. Web application server 705, in turn, transmits high priority data to back-end database server 706 with precedence over low priority data. Thus, the backend system (backend database sever 706 in the present example) may queue and process high priority data with greater precedence over lower priority data. In the illustrative example, backend database server 706 places high priority data in high priority queue 707a of (or interfaced with) filter 707, and places low priority data in low priority queue 707b of (or interfaced with) priority filter 707. Thus, by configuring each node to identify data priority based on a connection by which the data is received, prioritized processing is provided across each tier involved in transaction processing in a multiple tiered data processing system network.

The priority of processing data is reciprocally provided in multi-tier network 700. That is, data received (e.g., return data resulting from execution of a database transaction by backend database server 706) by web application server 705 via a priority class HI connection 720a from backend database server 706 is provided greater processing precedence by web application server 705 than transactions received via priority class LO connections 720b. Likewise, data received by web server 704 from web application server 705 via HI priority connections 715a is provided greater processing precedence than data received by web server 704 from web application server 705 via low priority connections 715b. Thus, prioritization of transaction processing is provided in multi-tier network 700 during both transaction request and transaction return messaging.

Figure 7B:
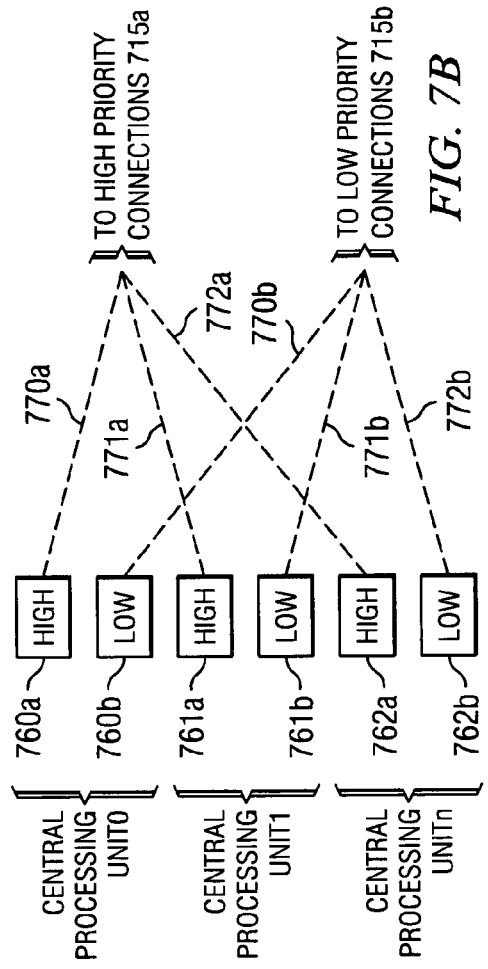
FIG. 7B is a diagrammatic illustration of prioritized data queues configured to facilitate data processing prioritization transfer in a multi-tier network in accordance with a preferred embodiment of the present invention.

With reference now to FIG. 7B, a diagrammatic illustration of prioritized data queues configured to facilitate data processing prioritization transfer in a multi-tier network is shown in accordance with a preferred embodiment of the present invention. Data queues 760a-762b may be implemented as computer-readable instructions stored in a memory, such as a local memory, and fetched therefrom by a processing unit of a server system deployed as a front-end node in multi-tier network 700. Data queues 760a-762b are preferably implemented within, or interface with, a priority filter, such as priority filter 730 run by web server 704. Data queues 760a-762b are examples of per-processor data queues, such as queues 500a-502b shown in FIG. 5, for frame-level data queuing as described above.

In the present example, high priority queues 760a, 761a, and 762a are logically mapped to high priority connections 715a, and low priority queues 760b, 761b, and 762b are logically mapped to low priority connections 715b. Logical mappings 770a-772b for associating respective queues 760a-762b with connections of a particularly priority may be implemented by, for example, a linked list, relational database, or any other suitable data structure. Thus, data queued in high priority queues 760a-762a to be transmitted to web application server 705 is provided precedence for transmission via high priority connections 715a over data queued in low priority queues 760b-762b for transmission via low priority connections 715b. In the illustrative examples, queues and connections of two priority classes are shown. However, the bi-level prioritization provided in the examples is illustrative only and is chosen to facilitate an understanding of the invention, and any number of queues and connection priority levels may be substituted for the configuration shown.

Figure 7C:
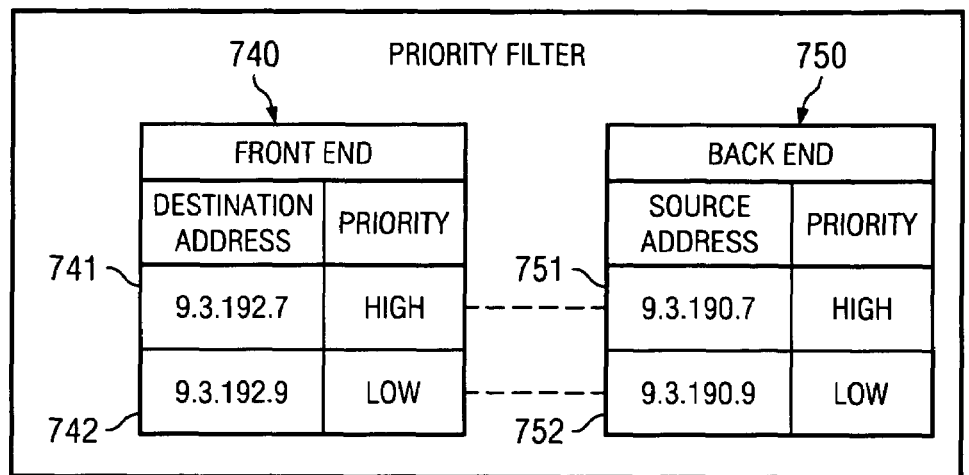
FIG. 7C is a diagrammatic illustration of a priority filter that facilitates transferring request priority classes across nodes in a multi-tier network of data processing systems in accordance with a preferred embodiment of the present invention.

To facilitate transfer of processing priorities across nodes of multi-tier network 700, priority filters are implemented in each node involved in processing of the transaction. With reference now to FIG. 7C, a diagrammatic illustration of a priority filter that maps client connections to back-end connections for transferring priority classes across nodes in a multi-tier network of data processing systems is shown in accordance with a preferred embodiment of the present invention. Priority filter 731 is preferably implemented as a set of computer-readable instructions and may be implemented in, or interface with, a network stack of the host server, e.g., web application server 705, running priority filter 731.

In intermediate nodes, i.e., nodes that receive data to be processed and that must forward data to another node in multi-tier network 700, transfer of priority classes is facilitated by logical mappings between front-end and back-end server addresses. In the illustrative example, web application server 705 has two network addresses through which front-end connections may be made with web server 704, namely IP addresses 9.3.192.7 and 9.3.192.9, and web application server 705 has two network addresses through which back-end connections may be made with back-end database server 706, namely IP addresses of 9.3.190.7 and 9.3.190.9. In accordance with embodiments of the invention, priority classes are transferred from a requesting entity to a target entity via an intermediate server of multi-tier network 700 by way of mappings between prioritized connections. To this end, associations between web application server front-end addresses and back-end address are defined by filter 731. In the illustrative example, table 740 defines front-end (destination) addresses at which data is received by web application server 705, e.g., from web server 704 on behalf of clients 708 and 709 and corresponding priorities of the front-end addresses. Particularly, record 741 of table 740 defines a priority class of HI for requests received by web application server 705 with a destination address of 9.3.192.7, and record 742 of table 740 defines a priority class of LO for requests received by web application server 705 with a destination address of 9.3.192.9. Another table 750 defines source (back-end) addresses with which web application server 705 connects with back-end database server 706 and corresponding priorities for the back-end addresses. Particularly, record 751 of table 750 defines a priority class of HI for connections with back-end database server 706 established with the web application server source address of 9.3.190.7, and record 752 of table 750 defines a priority class of LO for connections with back-end database server 706 established with the web application server source address of 9.3.190.9. Thus, on identification of a priority of data received by web application server 705, the request priority may be transferred to the back-end database by sending the request on a connection that has a corresponding priority. For example, assume a request for a database query is issued by client 708 and is received by web application server 705 from web server 704. The request is analyzed to determine the destination address to which the request was directed. On identification of the destination address of the request, a priority of the request is determined based on the association of the destination address and priority class. Alternatively, the request priority may be identified by way of the connection on which the data is received by web application server 705. For example, web application server 705 may simply identify any data received over connections 715a as high priority data and any data received over connections 715b as low priority data.

Upon identification of the data priority, a source address that corresponds to the determined priority class is then identified and the request is communicated to the back-end service via the source address that has a corresponding priority.

As an example, assume a request from client 708 is sent to web application server 705 via web server 704 and that web server 704 connects with web application server 705 by addressing a request to the low priority front-end address (9.3.192.9) of web application server 705. For example, web server 704 may connect with web application server 705 on low priority connection 715b that terminates at the low priority front-end address of web application server 705 after identifying client 708 as having a low priority SLA. Such an identification of client 708 may be made by a filter mechanism that identifies client priority SLAs, such as filter 441 shown and described in FIG. 4. On receipt of the request data by the web application server, the request is supplied to priority filter 731 and the front-end address at which the data was received by web application server 705 is read. In the present example, priority filter 731 reads the front-end address of web application server 705 to which the request was addressed and identifies the request as a LO priority address by way of the front end destination address and priority association defined in record 742.

On identification of the request as a LO priority request, web application server 705 then communicates the request to back-end database server 706. Particularly, web server 705 includes the low priority source address (9.3.190.9) in the request and supplies the request to low priority connection 720b for communication to back-end database server 706.

Accordingly, by implementing a priority filter in back-end database server 706 that queues requests according to the request priority, backend database server 706 may process requests according to predefined priority classes that have been originally identified at a front-end node of multi-tier network 700, e.g., web server 704, and that has been propagated through each node involved in conveying the transaction request to backend database server 706. In the illustrative example, back-end database server 706 includes priority filter 707 that provides a higher precedence to requests received over high priority connection 720a than requests received over low priority connection 720b. Particularly, priority filter 707 includes, or interfaces with, high priority queue 707a and low priority queue 707b in which requests received over respective high priority connections 720a and low priority connections 720b are queued. Accordingly, processing of requests received at back-end database server 706 may be performed according to priority classifications that are transferred between multiple tiers in a network of data processing systems.

Figure 8:
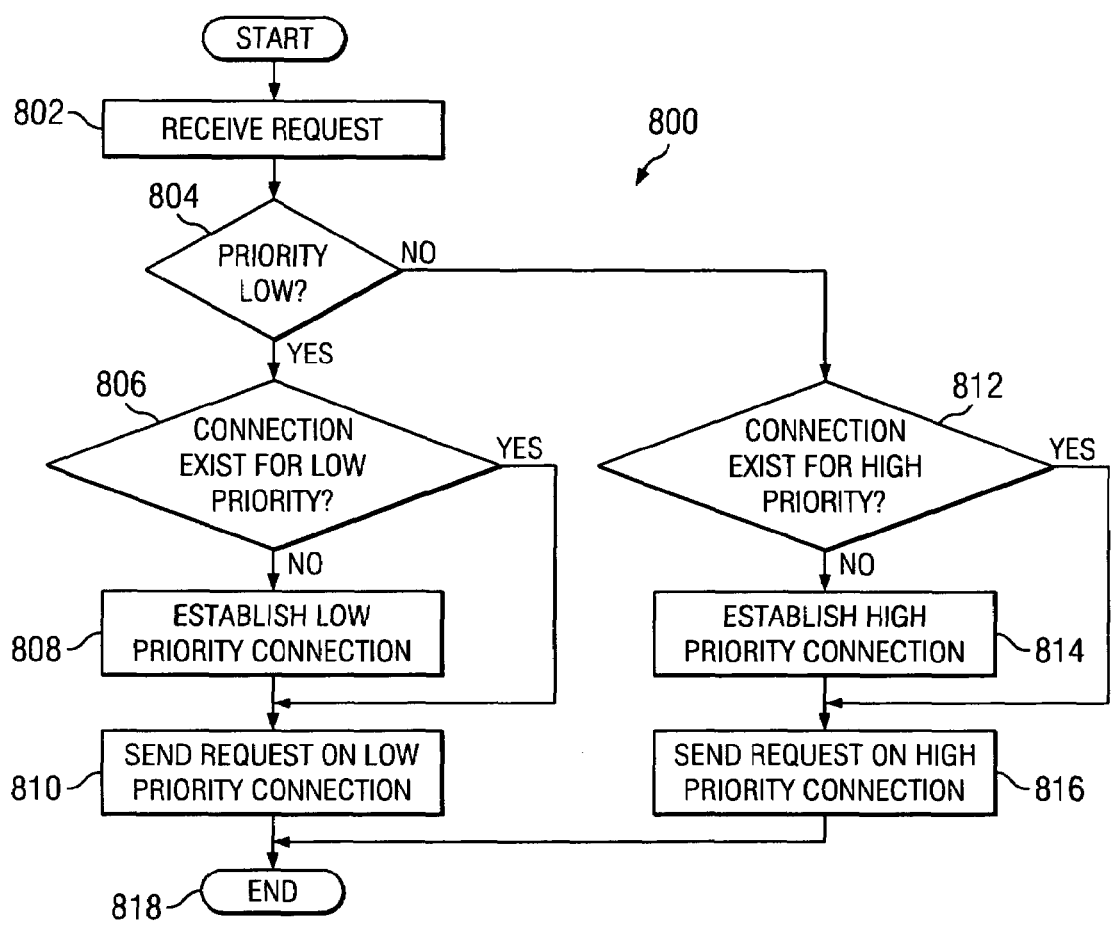
FIG. 8 a flowchart of runtime processing performed by a priority filter for transferring request priorities across nodes in a multi-tier network in accordance with a preferred embodiment of the present invention.

FIG. 8 is a flowchart of runtime processing performed by a priority filter for transferring request according to request priorities across nodes in a data processing system network in accordance with a preferred embodiment of the present invention. The runtime routine processing depicted in flowchart 800 is preferably implemented by computer-readable instructions implemented as a filter, such as priority filter 730, that is processed by a data processing system, such as web application server 705 and is used to dispatch queued data from prioritized queues.

The runtime priority filter routine begins, for example, on system boot or another invocation, and awaits receipt of a request, such as a database transaction request or other back-end service transaction. On receipt of the request (step 802), e.g., upon dispatch from a queue, an evaluation of the request priority is made by the priority filter (step 804). In particular, the request is evaluated to determine if the request is a low priority request. In the event the request is evaluated as a low priority request, the run-time priority filter routine proceeds to evaluate whether a connection exists for LO priority requests (step 806). If a low priority connection does not exist, one is established (step 808) and the routine then proceeds to send the request on the newly established LO priority connection (step 810). If, at step 806, it is determined that a LO priority connection already exists, e.g., low priority connections 720b in FIG. 7A, the runtime priority filter routine then proceeds to send the request on the LO priority connection according to step 810. After the request is send via the LO priority connection, the runtime priority filter cycle then completes (step 818).

Returning again to step 804, if the request is not evaluated as a LO priority request, an evaluation is made to determine if a HI priority connection exists (step 812). If a HI priority connection does not exist, one is established (step 814) and the routine then proceeds to send the request on the newly established HI priority connection (step 816). If, at step 812, it is determined that a HI priority connection already exists, e.g., high priority connections 720a, the runtime priority filter routine then proceeds to send the request on the HI priority connection according to step 816. After the request is sent via the HI priority connection, the runtime priority filter cycle then completes according to step 818.

Thus, by implementing data prioritization at the backend service, e.g., in filter 707, data processing priority is provided to clients of different priorities in a multi-tier network. For example, filter 707 may include high priority queue 707a and low priority queue 707b for providing processing precedence for data received over high priority connections 720a and low priority connections 720b.

It should be understood that the examples of bi-priority request filtering and priority transfers are illustrative only, and the teachings of the invention may be extended to a system having any number of request priority classes.

As described, embodiments of the present invention provide mechanisms for transferring request priorities across nodes in a network of data processing systems. By transferring request priorities across multiple nodes in a data processing system network, the precedence of request processing is ensured in any node involved in conveying or processing of a transaction in a multi-tiered data processing system network.

In accordance with another embodiment of the present invention, connections between two network nodes may have priorities dynamically reassigned for facilitating efficient network transmission capacity utilization. With reference again to FIGS. 7A and 7B, high priority connections 715a and 720a preferably comprise a plurality of respective connections that communicatively connect web server 704 with web application server 705 and web application server 705 with backend database server 706 used for conveyance therebetween of data classified as high priority. Low priority connections 715b and 720b preferably comprise a plurality of connections that communicatively connect web server 704 with web application server 705 and web application 705 with backend database server 706 for conveyance therebetween of data classified as low priority. That is, each of high priority connections 720a and low priority connections 720b comprise respective connection pools of high and low priority.

The number of high priority connections 715a and 720a and low priority connections 715b and 720b is limited by the network infrastructure capacity, e.g., by the particular network interface cards terminating high priority connections 715a and 720a and low priority connections 715b and 720b, the respective processing capacity of web application server 705 and backend database server 706, and the like. Thus, a finite number of connections allocated to high priority connections 715a and 720a and low priority connections 715b and 720b may be respectively defined that represent the maximum number of concurrent connections that may be supported thereby.

In accordance with a preferred embodiment of the present invention, connections may be dynamically reassigned between connection priority classes to facilitate optimized utilization of network transmission capacity in a multi-tier network that services prioritized data transfers. In a preferred embodiment, a priority filter may define a maximum number of connections on a priority basis. For example, a maximum number of connections concurrently sustainable over high priority connections 715a and a maximum number of connections concurrently sustainable over low priority connections 715b may be defined in priority filter 730 run by web server 704 and in priority filter 731 run by web application server 705. Likewise, a maximum number of connections concurrently sustainable over high priority connections 720a and a maximum number of connections concurrently sustainable over low priority connections 720b may be defined in priority filter 731 run by web application server 705 and in backend database server filter 707.

As referred to herein, a maximum number of connections that may be sustained over a common priority set of connections is referred to as the connections capacity. In accordance with a preferred embodiment of the present invention, a portion of a capacity of connections of a first priority may be reassigned to the capacity of connections of another priority to facilitate optimized network transmission capacity in a multi-tier network system. For example, if the number of high priority connections being utilized for transaction transmissions exceeds a saturation threshold that is a predefined portion of the total available high priority connections, an attempt may be made to reassign a subset of the low priority connections to the high priority connections. Reassignment of the subset of low priority connections to the high priority connections is preferably contingent on the number of low priority connections being utilized for low priority data transmissions being below an idle threshold that is a predefined portion of the total available low priority connections. That is, reassignment of a portion of the low priority connections capacity may be made if sufficient low priority connection capacity is idle or not in use. Thus, in the event that the amount of high priority data being transferred over the high priority connections is approaching the capacity of the high priority connections, the capacity of the high priority connections may be increased by reassigning connections designated as low priority to the high priority connections pool. Reassignment of the low priority connections to the high priority connections may be made, for example, by re-designating a subset of the low priority connections as high priority connections.

With reference now to FIG. 9A, a diagrammatic illustration of a priority filter, or a module thereof, that facilitates dynamic reassignment of connection capacities between connection priority classes is shown in accordance with a preferred embodiment of the present invention. Priority filter 950 is preferably implemented as a set of computer-readable instructions and may be implemented in, or interface with, a network stack of the host server running priority filter 950. Priority filter 950 is an example of a priority filter, such as priority filter 730 shown in FIGS. 7A and 7B, run by a network node that terminates a network connection.

In the present example, priority filter 950 is run by a server that has two network addresses through which connections may be made with another network node. Particularly, priority filter 950 is illustrative of a priority filter run by web server 704 shown in FIG. 7 that establishes connections with web application server 705. In the illustrative example, priority filter 950 is implemented as a table having records 951 and 952 that respectively define two IP addresses 9.3.194.7 and 9.3.194.9 through which the network node running priority filter 950 establishes respective high and low priority connections 715a and 715b with web application server 705. Additionally, capacities of the connections established with respective addresses are defined in records 951 and 952. In the illustrative example, record 951 of filter 950 defines a priority class of HI for data transactions to be transmitted on connections having a source address of 9.3.194.7, and record 952 of filter 950 defines a priority class of LO for data transactions to be transmitted on connections having a source address of 9.3.194.9. In the filter configuration depicted in FIG. 9A, each of the high priority connections and low priority connections are respectively allocated a connection capacity of 100. In general, the connection capacity allocated to high priority connections and low priority connections comprises subsets or partitions of an overall transmission capacity of the network node running priority filter 950. The connection capacity may, for example, comprise a number of connections in a connection pool, logical channels on a connection medium, or the like. Thus, in the configuration shown, each of the high priority connections and low priority connections have equal capacity for transmission of respective data of high and low priority classes.

In accordance with a preferred embodiment of the present invention, capacity of one connection priority class may be reassigned to another connection priority class. Reassignment may be made, for example, on identification of predefined network metrics, such as traffic loads identified on respective high and low priority connections. For example, assume a large number of high priority clients relative to low priority clients are connecting with web server 704. Thus, the high priority connections terminated at source address 9.3.194.7 will experience a relatively high load, and low priority connections terminated at source address 9.3.194.9 will experiencing a relatively low load. In such a situation, capacity of the low priority connections is dynamically reassigned to the high priority connections.

FIG. 9B is a diagrammatic illustration of priority filter 950 shown in FIG. 9A after reassignment of connection capacity from the low priority connection priority class to the high priority connection capacity class. In the illustrative example, half (50) the original connection capacity (100) has been reassigned from the low priority connections to the high priority connections resulting in a high priority connection capacity of 150 and a low priority connections capacity of 50. Preferably, the priority filter includes, or interfaces with, a traffic evaluation module that monitors the connection priorities of clients requesting connection with web server 704. For example, priority filter 730 may include a module for accumulating traffic metrics that indicate the relative loads of high and low priority clients.

To facilitate connection capacity reassignment, the reassignment is propagated to each node in the multi-tier network. For example, on detection of a traffic condition that results in web server 704 reassigning low priority connection capacity to the high priority connection capacity, web server 704 issues a reassignment command to web application server 705 directing web application server 705 to configure the termination of high priority connections 715a and low priority connections 715b according to the capacity reassignment. In the example provided above with reference to FIGS. 9A and 9B, web server 704 would issue a reassignment directive to web application server 705 that directs web application server 705 to increase the capacity of high priority connections terminated at web application server high priority address 9.3.192.7 by 50 connections, and to reduce the capacity of low priority connections terminated at web application server low priority address 9.3.192.9 by 50 connections.

In a similar manner, web application server 705 increases the capacity of high priority connections 720a and decreases the capacity of low priority connections 720b that interconnect web application server 705 with backend database server 706. Reassignment of capacity of low priority connections 720b to high priority connections 720a is preferably performed in corresponding proportion to the reassignment made between web server 704 and web application server 705. In a like manner, web application server 705 issues a directive to backend database server 706 to configure the termination of high priority connections 720a and low priority connections 720b according to the reassignment made at web application server 705. Thus, the connection capacity reassignment invoked at web server 704 in response to traffic conditions detected thereby is propagated through intervening nodes and to the backend database server 706.

FIG. 9C is a diagrammatic illustration of web server 704, web application server 705 and backend database server 706 and connections therebetween prior to reassignment of connection capacity. In the illustrative example, dashed lines in connections 715a-715b and 720a-720b are each representative of a connection capacity of 50. Accordingly, each of the high priority connections 715a and 720a are configured with a connection capacity of 100. After the exemplary reassignment described above, a connection capacity of 50 has been reassigned from low priority connection 715b to high priority connection 715a, and from low priority connection 720b to high priority connection 720a as diagrammatically illustrated in FIG. 9D.

With reference now to FIG. 10, a flowchart of a connection priority reassignment routine for reassigning connections between different priority classes is shown in accordance with a preferred embodiment of the present invention. The connection priority reassignment routine depicted in FIG. 10 is preferably implemented as computer-readable instructions implemented as, or that interface with, a priority filter that is processed by a data processing system, such as web server 704 shown in FIG. 7, in a multi-tier network system.

The connection priority reassignment routine begins, for example on system boot or on invocation by a user such as a system administrator, and measures the high priority connections load (step 1002). The high priority connections load may be determined as a current number of connections being used on high priority connections, such as high priority connections 715a shown in FIG. 7, a measure of the number of high priority client requests received over a predefined interval at web sever 704, or by another suitable mechanism for identifying prioritized traffic loads. Alternatively, the high priority connections load may be a count of the number of high priority clients that have entered into an SLA with an administrator of web server 704.

The high priority connections load is then compared with a saturation threshold (step 1004). The saturation threshold is a value that defines a high priority connection load level at which an attempt to add additional high priority connection capacity from another connection priority level is to be made. If the high priority connection load does not exceed the saturation threshold, the connection priority reassignment routine cycle then ends (step 1016). If, however, it is determined that the high priority connection load level exceeds the saturation threshold, the low priority connections load is measured (step 1006). Measurement of the low priority connections load may be made, for example, by reading a current load of the low priority connections, measuring an average load of the low priority connections over a predefined interval, a count of the number of clients that have a low priority SLA serviced by web server 704, or by another suitable mechanism.

The low priority connections load is then compared with an idle threshold (step 1008). The idle threshold is a value that defines a low priority connection load level below which capacity of the low priority connections may be reassigned to the high priority connections without unduly impacting transmission performance of the low priority connections. For example, the idle threshold may be defined as fifty percent of the overall low priority connections capacity. Thus if the current load level of the low priority connections is less than fifty percent of the low priority connections capacity, a portion of the low priority connections capacity may be reassigned to the high priority connections.

If it is determined that the low priority connections load is not less than the idle threshold at step 1008, the connection priority reassignment routine then evaluates whether the resource limits of the high priority connections have been reached (step 1009). If the resource limits on the high priority connections have been reached, the connection priority reassignment routine then ends according to step 1016. If it is determined that the resource limits have not been reached at step 1009, additional capacity that has not been assigned to any connection priority level is added to the high priority connections (step 1011). An evaluation is then made to determine if there is an additional downstream node (step 1013). If there is no downstream node, the connection priority reassignment routine cycle then ends according to step 1016. If a downstream node exists, a directive to add additional capacity to the high priority connections is issued to the downstream node (step 1015), and the connection priority reassignment routine cycle then ends according to step 1016.

Returning again to step 1008, if the low priority connections load is determined to be less than the idle threshold at step 1008, the connection priority reassignment routine cycle then reassigns a portion of the low priority connections capacity to the high priority connections capacity (step 1010). An evaluation is then made to determine if there is another downstream node to be reconfigured according to the connection capacity reassignment (step 1012). If no downstream node exists, the connection priority reassignment routine cycle then ends according to step 1016. If it is determined that a downstream node exists at step 1012, the node issues a directive to the downstream node that directs the downstream node to reconfigure the connections according to the connection capacity reassignment (step 1014), and the connection priority reassignment routine cycle then ends according to step 1016.

Figure 11:
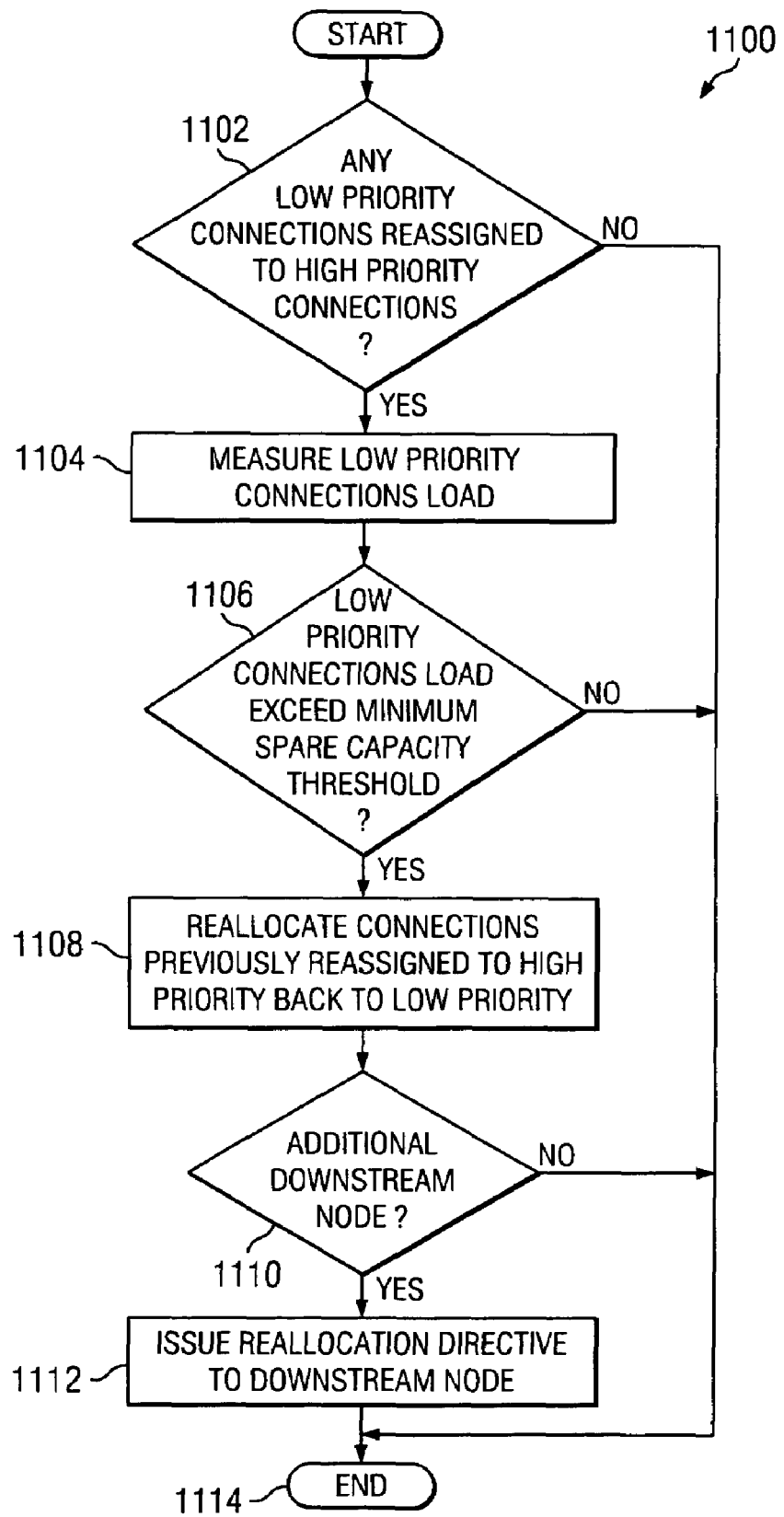
FIG. 11 is a flowchart of a connection priority reallocation routine for reallocating connection capacity previously reassigned to another connection priority class in accordance with a preferred embodiment of the present invention.

With reference now to FIG. 11, a flowchart of a connection priority reallocation routine for reallocating connection capacity previously reassigned to another connection priority class is shown in accordance with a preferred embodiment of the present invention. The connection priority reallocation routine depicted in FIG. 11 is preferably implemented as computer-readable instructions implemented as, or that interface with, a priority filter that is processed by a data processing system, such as web server 704 shown in FIG. 7, in a multi-tier network system.

The connection priority reallocation routine begins, for example on system boot or on invocation by a user such as a system administrator, and evaluates whether any low priority connection capacity has previously been reassigned to the high priority connection capacity (step 1102). If no low priority connection capacity has been previously reassigned to the high priority connections capacity, the connection priority reallocation routine cycle then ends (step 1114). If it is determined that any low priority connections capacity has previously been reassigned to the high priority connections capacity, a measurement of the low priority connections load is made (step 1104).

An evaluation is then made to determine if the low priority connections exceeds a minimum spare capacity threshold (step 1106). As referred to herein, the minimum spare capacity threshold defines a low priority connection load level at which previously reassigned low priority connections capacity (or a portion thereof) is to be reallocated to the low priority connections capacity. If the low priority connections load does not exceed the minimum spare capacity threshold, the connection priority reallocation routine cycle then ends according to step 1114. If it is determined that the low priority connections load exceeds the minimum spare capacity threshold at step 1106, the low priority connections capacity (or a portion thereof) that was previously reassigned to the high priority connections capacity is reallocated to the low priority connections capacity (step 1108). An evaluation is then made to determine if there is another downstream node to be reconfigured according to the connection capacity reallocation (step 1110). If no downstream node exists, the connection priority reallocation routine cycle then ends according to step 1114. If it is determined that a downstream node exists at step 1110, the node issues a directive to the downstream node that directs the downstream node to reconfigure the connections according to the connection capacity reallocation (step 1112), and the connection priority reassignment routine cycle then ends according to step 1114.

As described, the present invention provides mechanisms for reassigning connection capacity from one priority class to another priority class to facilitate optimized utilization of transmission capacity in a multi-tier network. As the capacity of connections of one priority class approaches saturation, spare capacity may be reassigned from another class to the priority class approaching saturation, and connection capacity reassignment is propagated through the multi-tier network. Additionally, mechanisms for reallocating connection capacity that was previously reassigned to connections of a priority class from which the capacity was originally reassigned is provided. Accordingly, the overall network capacity is more effectively utilized.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of reassigning connection capacity between prioritized connection classes in a multi-tiered network system, the method comprising the computer implemented steps of:

allocating a first transmission capacity to connections of a first priority class terminated by a first node and a second node in the network;

allocating a second transmission capacity to connections of a second priority class terminated by the first node and the second node;

identifying a first traffic load of the first priority class that exceeds a predefined threshold; responsive to identifying the first traffic load, reassigning a portion of the second transmission capacity to the first priority class; and responsive to reassigning the portion, directing a third node to reassign a portion of a transmission capacity of connections of the second priority class terminated by the third node to connections of the first priority class terminated by the third node.

2. The method of claim 1, wherein identifying the first traffic load comprises measuring the traffic load of the connections of the first priority class terminated by the first node and the second node.

3. The method of claim 1, further comprising:

comparing the first traffic load with the predefined threshold, wherein the predefined threshold specifies a value of the first traffic load at which capacity of another priority class may be reassigned to the first priority class.

4. The method of claim 3, wherein reassigning the portion is performed responsive to determining the first traffic load exceeds the predefined threshold.

5. The method of claim 1, further comprising:

identifying a traffic load of the connections of the second priority class terminated by the first node and the second node; and comparing the traffic load of the connections of the second priority class terminated by the first node and the second node with a second predefined threshold, wherein the second predefined threshold specifies a value of the second traffic load at which a portion of the second transmission capacity may be reassigned to another priority class.

6. The method of claim 5, wherein reassigning the portion is performed responsive to determining the traffic load of the connections of the second priority class terminated by the first node and the second node is less than the second predefined threshold.

7. The method of claim 1, further comprising:

identifying a traffic load of the connections of the second priority class terminated by the first node and the second node; and comparing the traffic load of the connections of the second priority class terminated by the first node and the second node with a second predefined threshold, wherein the second predefined threshold specifies a value of the second traffic load at which the portion is to be reallocated from the connections of the first priority class terminated by the first node and the second node to the connections of the second priority class terminated by the first node and the second node.

8. A computer readable recordable medium encoded with computer executable instructions for reassigning connection capacity between prioritized connection classes in a multi-tier network system, the computer executable instructions comprising:

first instructions that allocate a first transmission capacity to connections of a first priority class terminated by a first node and a second node in the network;

second instructions that allocate a second transmission capacity to connections of a second priority class terminated by the first node and the second node;

third instructions that identify a first traffic load of the first priority class that exceeds a predefined threshold;

fourth instructions that, responsive to the third instructions identifying the first traffic load, reassign a portion of the second transmission capacity to the first priority class; and responsive to reassigning the portion, directing a third node to reassign a portion of a transmission capacity of connections of the second priority class terminated by the third node to connections of the first priority class terminated by the third node.

9. The computer readable recordable medium of claim 8, wherein the third instructions measure the traffic load of the connections of the first priority class terminated by the first node and the second node.

10. The computer readable recordable medium of claim 8, further comprising:

fifth instructions that compare the first traffic load with the predefined threshold, wherein the predefined threshold specifies a value of the first traffic load at which capacity of another priority class may be reassigned to the first priority class.

11. The computer readable recordable medium of claim 10, wherein the fourth instructions reassign the portion in response to the fifth instructions determining the first traffic load exceeds the predefined threshold.

12. The computer readable recordable medium of claim 8, further comprising:

fifth instructions that identify a traffic load of the connections of the second priority class terminated by the first node and the second node; and sixth instructions that compare the traffic load of the connections of the second priority class terminated by the first node and the second node with a second predefined threshold, wherein the second predefined threshold specifies a value of the second traffic load at which a portion of the second transmission capacity may be reassigned to another priority class.

13. The computer readable recordable medium of claim 12, wherein the fourth instructions reassign the portion responsive to the sixth instructions determining the traffic load of the connections of the second priority class terminated by the first node and the second node is less than the second predefined threshold.

14. The computer readable recordable medium of claim 8, further comprising:

fifth instructions that identify a traffic load of the connections of the second priority class terminated by the first node and the second node; and sixth instructions that compare the traffic load of the connections of the second priority class terminated by the first node and the second node with a second predefined threshold, wherein the second predefined threshold specifies a value of the second traffic load at which the portion is to be reallocated from the connections of the first priority class terminated by the first node and the second node to the connections of the second priority class terminated by the first node and the second node.

15. A data processing system for reassigning connection capacity between prioritized connection classes in a network system, comprising:
- a communication interface connected with a communication medium, wherein the communication interface has a transmission capacity partitioned into a first transmission capacity of a first priority and a second transmission capacity of a second priority;
- a memory that contains a set of instructions for reassigning connection capacities between the first priority and the second priority; and
- a processing unit that, responsive to execution of the set of instructions, allocates a first transmission capacity to connections of a first priority class terminated by a first node and a second node in the network; allocates a second transmission capacity to connections of a second priority class terminated by the first node and the second node; identifies a first traffic load of the first priority class that exceeds a predefined threshold; responsive to identifying the first traffic load, reassigns a portion of the second transmission capacity to the first priority class; and responsive to reassigning the portion, directs a third node to reassign a portion of a transmission capacity of connections of the second priority class terminated by the third node to connections of the first priority class terminated by the third node.

16. The data processing system of claim 15, wherein the processing unit reassigns the portion responsive to determining the traffic load exceeds the predefined threshold.

17. The data processing system of claim 15, wherein the processing unit, responsive to execution of the set of instructions, identifies a traffic load of the second priority class and compares the traffic load of the second priority class with a second predefined threshold, wherein the second predefined threshold specifies a value of the traffic load of the second priority class at which a portion of the second transmission capacity may be reassigned to another priority class.

18. The data processing system of claim 17, wherein the processing unit reassigns the portion responsive to determining the traffic load of the second priority class is less than the second predefined threshold.

19. The data processing system of claim 15, wherein the processing unit, responsive to execution of the set of instructions, identifies a traffic load of the second priority class and compares the traffic load of the second priority class with a second predefined threshold, wherein the second predefined threshold specifies a value of the second traffic load at which the portion is to be reallocated from the first priority class to the second priority class.

20. The data processing system of claim 15, wherein the first transmission capacity is allocated to a connection pool that is a first subset of the connections available on the communication medium, and the second transmission capacity is allocated to a connection pool that is a second subset of the connections available on the communication medium.

* * * * *